US010311905B1

(12) United States Patent
Guo et al.

(10) Patent No.: US 10,311,905 B1
(45) Date of Patent: Jun. 4, 2019

(54) METHODS, DEVICES, AND SYSTEMS FOR ESTABLISHING FLY-HEIGHT PARAMETERS FOR HARD DISK DRIVES

(71) Applicant: Seagate Technology LLC, Cupertino, CA (US)

(72) Inventors: ChengYi Guo, Singapore (SG); Sheng Yuan Lin, Singapore (SG); Teck Khoon Lim, Singapore (SG); Teck Hoon Chua, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/937,261

(22) Filed: Mar. 27, 2018

(51) Int. Cl.
*G11B 5/60* (2006.01)
*G11B 5/82* (2006.01)
*G06N 3/08* (2006.01)
*G11B 5/40* (2006.01)

(52) U.S. Cl.
CPC .............. *G11B 5/6011* (2013.01); *G06N 3/08* (2013.01); *G11B 5/40* (2013.01); *G11B 5/82* (2013.01); *G11B 5/607* (2013.01); *G11B 5/6076* (2013.01)

(58) Field of Classification Search
None
See application file for complete search history.

(56) References Cited

U.S. PATENT DOCUMENTS

| 6,574,754 | B1 | 6/2003 | Smith |
| 6,930,844 | B2 | 8/2005 | Yeh et al. |
| 7,269,525 | B1 | 9/2007 | Gough et al. |
| 7,468,856 | B2 | 12/2008 | Fitzpatrick et al. |
| 7,679,857 | B2 | 3/2010 | Zhu et al. |
| 7,773,336 | B2 | 8/2010 | Che et al. |
| 7,948,704 | B2 | 5/2011 | Ellis |
| 7,961,420 | B2 | 6/2011 | Park |
| 8,169,734 | B2 | 5/2012 | Tsunoda et al. |
| 8,316,263 | B1 | 11/2012 | Gough et al. |
| 8,521,670 | B2 | 8/2013 | Paguio |
| 9,177,599 | B1 | 11/2015 | Camilig et al. |
| 10,073,123 | B1 * | 9/2018 | Miao .................. G01R 33/0041 |
| 2005/0046985 | A1 * | 3/2005 | Morinaga ............ G11B 5/3136 360/31 |
| 2005/0185312 | A1 * | 8/2005 | Ueda ..................... G11B 5/6005 360/31 |
| 2006/0158769 | A1 * | 7/2006 | Ono ......................... G11B 5/60 360/75 |
| 2007/0030593 | A1 * | 2/2007 | Hiroyuki .............. G11B 5/6005 360/128 |
| 2007/0188907 | A1 * | 8/2007 | Satoh ................... G11B 5/6005 360/75 |

(Continued)

*Primary Examiner* — Tan X Dinh
(74) *Attorney, Agent, or Firm* — Faegre Baker Daniels LLP

(57) ABSTRACT

A method is disclosed for establishing a fly height parameter for a hard disc drive. The method includes receiving a set of testing data associated with the hard disc drive and subjecting the hard disc drive to a fly-height test at a first, nominal temperature to generate fly-height data. Based on the set of testing data and the fly-height data, the method includes predicting the hard disc drive's fly-height data for a fly-height test at a second temperature different from the first, nominal temperature. The method further includes establishing the fly-height parameter for the hard disc drive in response to the fly-height data and the predicted fly-height data.

20 Claims, 9 Drawing Sheets

(56) References Cited

U.S. PATENT DOCUMENTS

| | | | |
|---|---|---|---|
| 2007/0268615 A1* | 11/2007 | McFadyen | G11B 5/3133 360/75 |
| 2008/0043363 A1* | 2/2008 | Yamashita | G11B 5/6005 360/75 |
| 2009/0141390 A1 | 6/2009 | Oyamada et al. | |
| 2009/0153996 A1 | 6/2009 | Ellis | |
| 2009/0268335 A1* | 10/2009 | Huang | G11B 5/3133 360/75 |
| 2010/0002328 A1* | 1/2010 | Sato | G11B 5/6005 360/31 |
| 2010/0033860 A1 | 2/2010 | Tomita | |
| 2010/0208387 A1 | 8/2010 | Ehrlich | |
| 2011/0141607 A1* | 6/2011 | Ramamoorthy | G11B 5/6005 360/75 |
| 2011/0211276 A1 | 9/2011 | Tsunoda et al. | |
| 2011/0249361 A1* | 10/2011 | Mathew | G11B 5/012 360/75 |
| 2012/0056612 A1 | 3/2012 | Mathew et al. | |
| 2012/0229928 A1 | 9/2012 | Sakai | |
| 2013/0250446 A1 | 9/2013 | Zeng et al. | |

* cited by examiner

METHODS, DEVICES, AND SYSTEMS FOR ESTABLISHING FLY-HEIGHT PARAMETERS FOR HARD DISK DRIVES

SUMMARY

In certain embodiments, a method is disclosed for establishing a fly height parameter for a hard disc drive. The method includes receiving a set of testing data associated with the hard disc drive and subjecting the hard disc drive to a fly-height test at a first, nominal temperature to generate fly-height data. Based on the set of testing data and the fly-height data, the method includes predicting the hard disc drive's fly-height data for a fly-height test at a second temperature different from the first, nominal temperature. The method further includes establishing the fly-height parameter for the hard disc drive in response to the fly-height data and the predicted fly-height data.

In certain embodiments, a method is disclosed for establishing a fly height parameter for a hard disc drive. The method includes receiving a set of testing data associated with the hard disc drive and receiving fly-height data associated with the hard disc drive and generated from a fly-height test performed at a first, nominal temperature. Based on the set of testing data and the fly-height data, the method includes predicting the hard disc drive's fly-height data for a fly-height test at a second temperature different from the first, nominal temperature. The method further includes establishing a curve of the predicted fly-height data and generating modified predicted fly-height data by deleting predicted fly-height data that are outliers with the established curve. The method includes establishing the fly-height parameter for the hard disc drive in response to the fly-height data and the modified predicted fly-height data.

In certain embodiments, a system is disclosed for establishing a fly height parameter for a hard disc drive. The system includes a computing device comprising a trained artificial neural network, a processor, and a memory. The computing device is configured to: receive a set of testing data associated with the hard disc drive, receive fly-height data associated with the hard disc drive and generated from a fly-height test performed at a first, nominal temperature, compute fly-height data for a fly-height test at a second temperature using the trained artificial neural network, the received set of testing data, and the received fly-height data, and compute a plurality of fly-height parameters for the hard disc drive based on at least the received fly-height data and the computed fly-height data.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
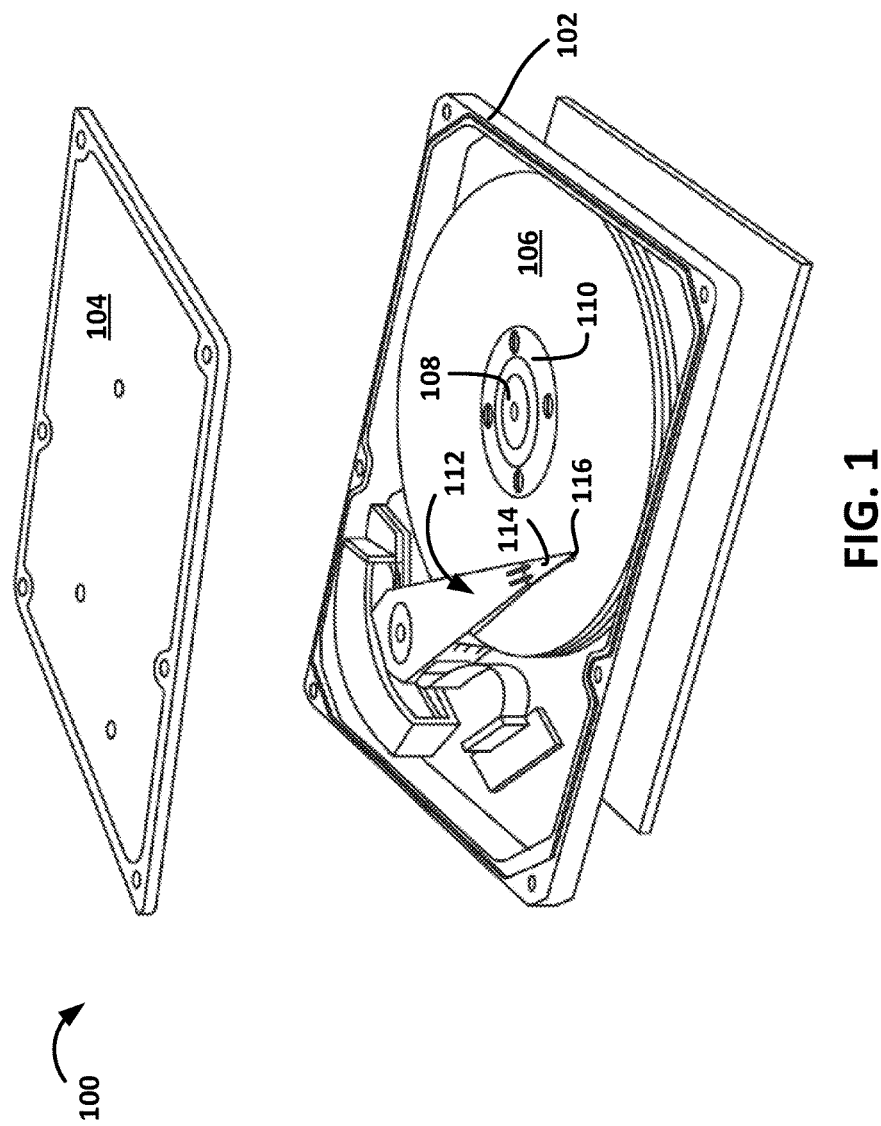
FIG. 1 shows an exploded, perspective view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure relate to establishing fly-height parameters for hard disc drives.

FIG. 1 shows an exploded, perspective view of a hard disc drive 100 having a base deck 102 and top cover 104. The hard disc drive 100 also includes magnetic recording discs 106 coupled to a spindle motor 108 by a disc clamp 110. The hard disc drive 100 also includes an actuator assembly 112 coupled to a suspension assembly 114 that suspends read/write heads 116 (only one read/write head 116 is shown in FIG. 1) over the magnetic recording discs 106. The read/write head 116 may include multiple transducers, including write elements that write data to data tracks of the magnetic recording discs 106 and read elements that read data from the data tracks.

Figure 2:
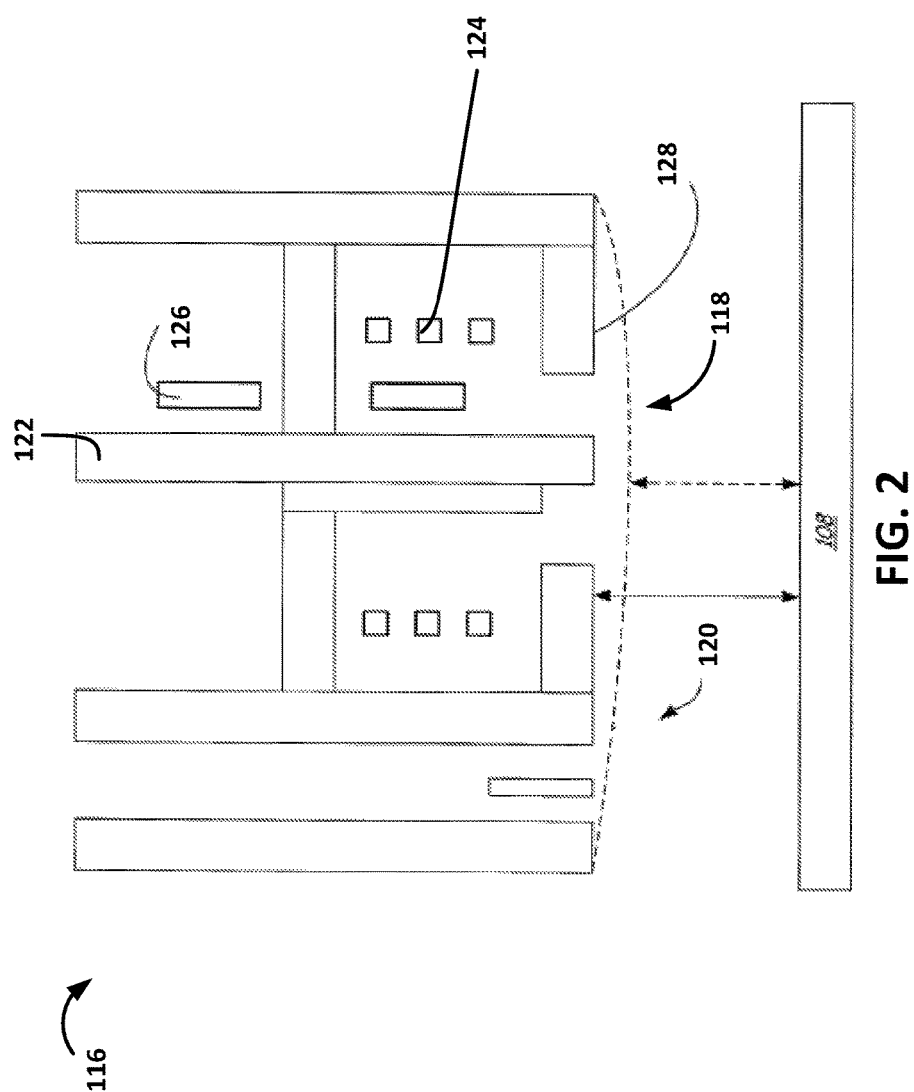
FIG. 2 shows a schematic side view of a read/write head of the hard disc drive of FIG. 1.

In operation, the read/write head 116 "flies" over the magnetic recording discs 106 as shown in FIG. 2. The distance between the read/write head 116 and the magnetic recording discs 106 can be referred to as head-to-media spacing or fly height. Head-to-media spacing typically decreases as hard disc drives 100 increase in areal density. That is, as hard disc drives 100 store more data bits per disc, the hard disc drives 100 are typically designed so that read/write heads 116 fly closer to the magnetic recording discs 106 during operation. Head-to-media spacing is affected as hard disc drives 100 operate across a range of environments (e.g., different temperature, humidity, and pressure ranges). When the read/write heads 116 fly too close to the magnetic recording discs 106, the read/write heads 116 can be damaged from accidental contact with the magnetic recording discs 106 or with particles between the read/write heads 116 and the magnetic recording discs 106. When the read/write heads 116 fly too high, the read/write heads 116 cannot accurately read data from or write data to the magnetic recording discs 106.

FIG. 2 shows the read/write head 116 having a writer portion 118 and a reader portion 120. The writer portion 118 includes a writer 122 and a coil 124 or set of coils positioned around and/or near the writer 122. FIG. 2 also shows the read/write head 116 having a heating circuit 126 that helps control head-to-media spacing. When current is passed through the heating circuit 126, the heating circuit 126 provides localized heat to induce thermal protrusion at an air bearing surface 128 of the read/write head 116. As a result of the protrusion, the head-to-media spacing can be altered. An example of thermal protrusion is shown as a dotted line in FIG. 2, protruding towards the magnetic recording disc 106.

As noted above, head-to-media spacing is affected as hard disc drives 100 operate across a range of environments such as different temperature ranges. To compensate for different temperature ranges, the hard disc drives 100 are subjected to a series of tests during manufacture that determine how each hard disc drive's head-to-media spacing changes with changes in temperature. These tests may involve placing hard disc drives 100 into ovens (or some other temperature-controlled environment) and gathering data while causing read/write heads 116 to protrude and contact the magnetic recording discs 106. The head-to-media contact is performed at different temperatures, and the resulting data is used to establish fly-height parameters that describe how the hard disc drive's head-to-media spacing changes with temperature. One example of a fly-height parameter is called a thermal clearance slope (TCS), which is a function—usually linear—that describes how the hard disc drive's head-to-media spacing changes with temperature. The TCS is used in the hard disc drives 100 to change the fly height of the read/write heads 116 in response to detected changes in temperature to ensure that the read/write heads 116 are consistently spaced from the magnetic recording discs 106 in different operating environments. For example, the TCS determined during manufacture may be stored in a hard disc drive's memory (e.g., in firmware) and used during operation of the hard disc drive. In certain embodiments, a different TCS is used during data-reading operations and during data-writing operations.

Figure 3:
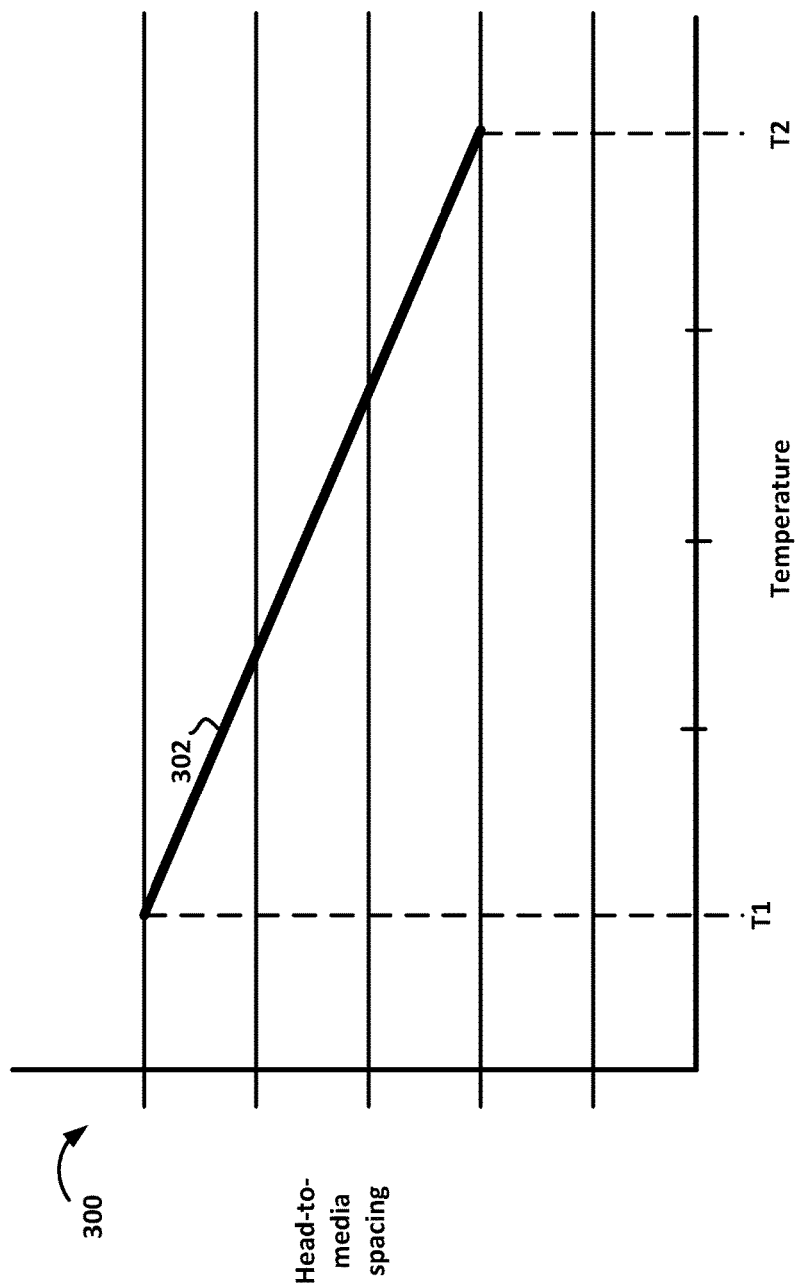
FIG. 3 shows a graph of a thermal clearance slope, in accordance with certain embodiments of the present disclosure.

FIG. 3 shows a graphical representation 300 of how test data can be used to establish a fly-height parameter 302 such as TCS. In certain embodiments, the fly-height parameter 302 is established by first subjecting the hard disc drive 100 to one or more tests while the hard disc drive 100 is at a first, nominal temperature (e.g., T1 in FIG. 3). The tests may involve, for example, cycling current through the read/write heads' heating circuits 126 while the hard disc drive 100 is positioned in an oven such that the read/write heads 116 protrude and eventually contact respective magnetic recording discs 106 at various zones along the magnetic recording discs 106. Based on the tests, a head-to-media spacing of the read/write head 116 at the first temperature is determined. This determined head-to-media spacing may include separate spacing data for each read/write head 116 in the disc drive 100. In addition, the determined head-to-media spacing may include spacing data for each read/write head 116 at different zones of the magnetic recording disc 106. For example, head-to-media spacing can vary from head-to-head and zone-by-zone because of differences in topology of the magnetic recording disc 106, for example. After subjecting the hard disc drive 100 to one or more tests at the first, nominal temperature, the hard disc drive 100 can be subjected to another test(s) at a second, nominal temperature (e.g., T2 in FIG. 3). Based on the tests at the second temperature, a head-to-media spacing of the read/write head 116 at the second temperature is approximated. The head-to-media spacing data of the read/write head 116 at the first temperature and at the second temperature can then be used to determine the fly-height parameter 302, which in FIG. 3 is the TCS. The TCS may be established on a head-by-head and/or a zone-by-zone basis. In other words, there may be a different TCS value applied for one read/write head compared to another and/or at one zone of the magnetic recording disc compared to another zone.

Certain embodiments of the present disclosure relate to establishing fly-height parameters with fewer steps and/or at a single, nominal temperature (e.g., +/−5 degrees Celsius, +/−2 degrees Celsius, +/−1 degree Celsius). As will be described in more details below, many of the approaches disclosed herein are able to save time by removing certain steps from the process discussed above, and may increase reliability of hard disc drives by removing steps involving contact between the read/write head 116 and the magnetic recording disc 106. For example, in certain embodiments, artificial neural networks are used to replace certain steps typically used to establish fly-height parameters.

Figure 4:
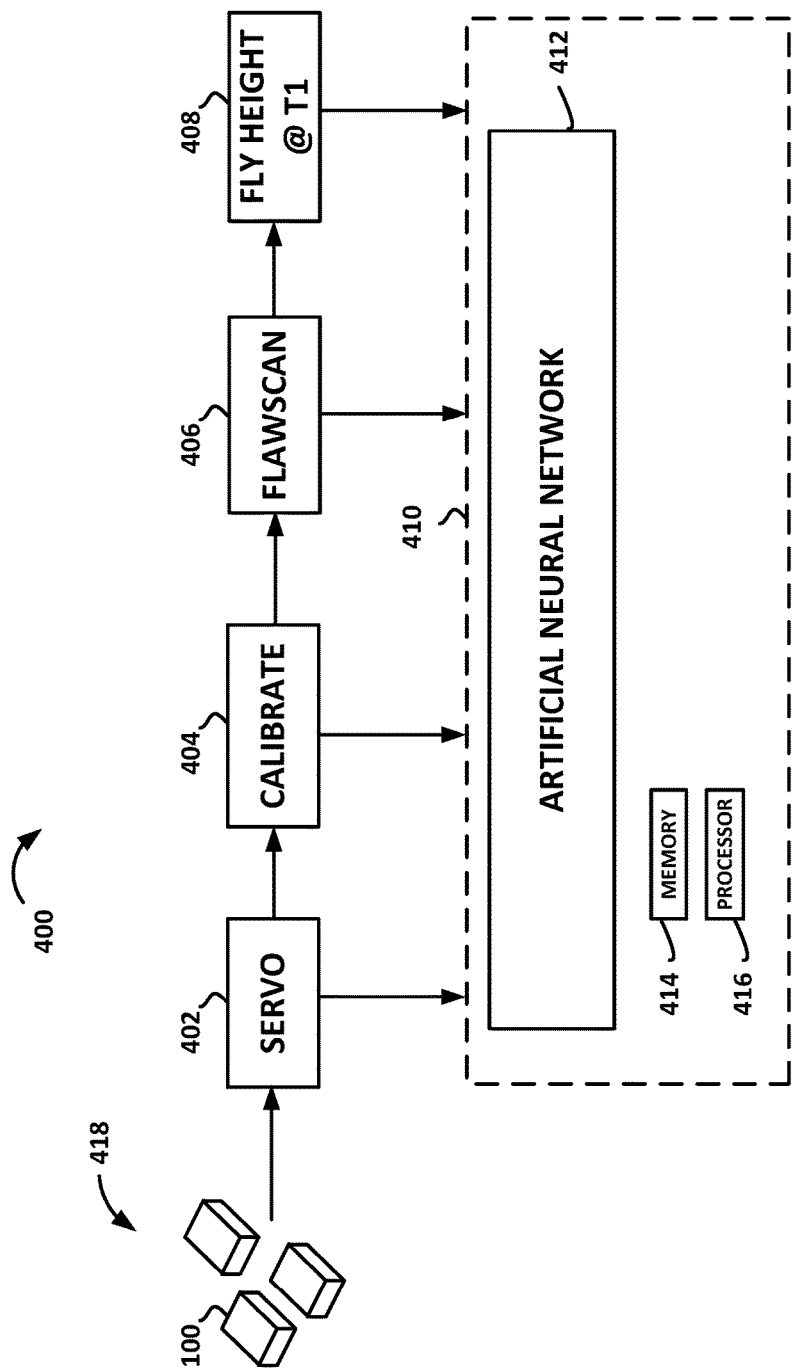
FIG. 4 shows a schematic of steps and features for manufacturing a hard disc drive, in accordance with certain embodiments of the present disclosure.

FIG. 4 shows a process 400 for testing and manufacturing hard disc drives 100. The process 400 includes subjecting the hard disc drives 100 to a series of tests to determine performance and/or establish operating parameters. In certain embodiments, the series of tests involve writing servo data to the magnetic recording discs (e.g., 106 in the exemplary hard disc drive in FIG. 1) (step 402), calibrating servo parameters (step 404), scanning for flaws on the magnetic recording discs (step 406), and performing fly height tests of a read/write head (e.g., 104) (step 408), among others. While certain steps are shown in a particular order in FIG. 4, these steps (as well as the tests in the series of tests) could be performed in different orders and/or in different combinations.

During each test in the series of tests, data is collected about the hard disc drive's performance and features. For example, when calibrating servo parameters as part of step 404, the collected data includes information about the data tracks, such as their eccentricity with respect to the magnetic recording disc 106 and/or a position error signal (PES). In another example, when scanning for flaws as part of step 406, the collected data includes information about the number of flaws and/or the location of particular areas of the magnetic recording disc 106 that may be unusable. In another example, when performing fly height tests in step 408, the collected data includes information about how the read/write head 104 responds to differences in heater power at a single, nominal temperature. More specifically, this collected data can include measurements regarding head-to-media spacing taken during read operations, measurements regarding head-to-media spacing taken during write operations, and information about the tracks (e.g., track radius) at which the measurements were taken.

The data described above (or portions thereof) can be used to predict—directly or indirectly—a fly-height parameter (e.g., TCS) without subjecting the hard disc drive to tests at a second, nominal temperature. As described above, this saves time by removing certain steps and may increase reliability of hard disc drives by removing steps involving contact between the read/write head 116 and the magnetic recording disc 106. In certain embodiments, the fly-height parameter or an input to calculating the fly-height parameter is predicted using one or more computing devices 410 that include an artificial neural network 412.

Generally speaking, artificial neural networks are computational models based on structures and functions of biological neural networks. Artificial neural networks can be implemented under a variety of approaches, including a multilayer feedforward network approach (as described below) or a recurrent neural network approach, among others. One artificial neural network approach involves identifying various inputs and target outputs for training an artificial neural network. For example, a set of "training data"—with known inputs and known outputs—is used to train the artificial neural network. The training data can be data samples for multiple types or categories of data and corresponding known target results for each data sample. The known inputs and outputs are fed into the artificial neural network, which processes that data to train itself to resolve/compute results for additional sets of data, this time with new inputs and unknown results. As a result, the artificial neural network can predict target outputs from a set of inputs. In this manner, a trained artificial neural network can use inputs that, individually, may not be direct parameters for particular tests or testing schemes and that may include different classes of parameters/data, to produce desired target outputs for those tests or testing schemes.

Figure 5:
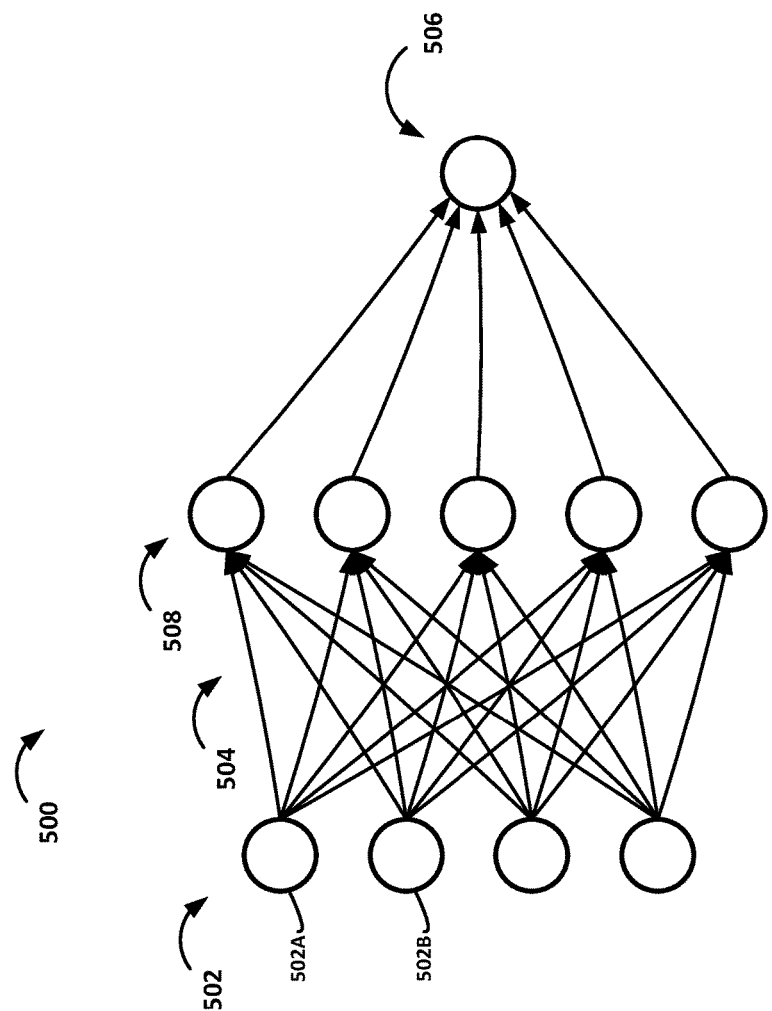
FIG. 5 represents features of a neural network, in accordance with certain embodiments of the present disclosure.

A visualization of an artificial neural network 500 is shown in FIG. 5. The artificial neural network 500 includes a number of nodes (sometimes referred to as neurons) 502 and connections 504, each of which run between a source node (e.g., 502A, 502B) and a target node (e.g., 506) in a single direction. Each node 502 represents a mathematical function (e.g., summation, division) applied to the one or more input of that node 502. Thus, each node represents types or classes of data.

An adaptive weight is associated with each connection 504 between the nodes 502. The adaptive weight, in some embodiments, is a coefficient applied to a value of the source node (e.g., 502A) to produce an input to the target node 506. The value of the target node is, therefore, a function of the source node inputs 502A, 502B, etc., multiplied by their respective weighting factors. For example, a target node 506 may be some function involving a first node 502A multiplied by a first weighting factor, a second node 502B multiplied by a second weighting factor, and so on. FIG. 5 also shows a number of hidden nodes 508, which will be explained in more detail below.

Figure 6:
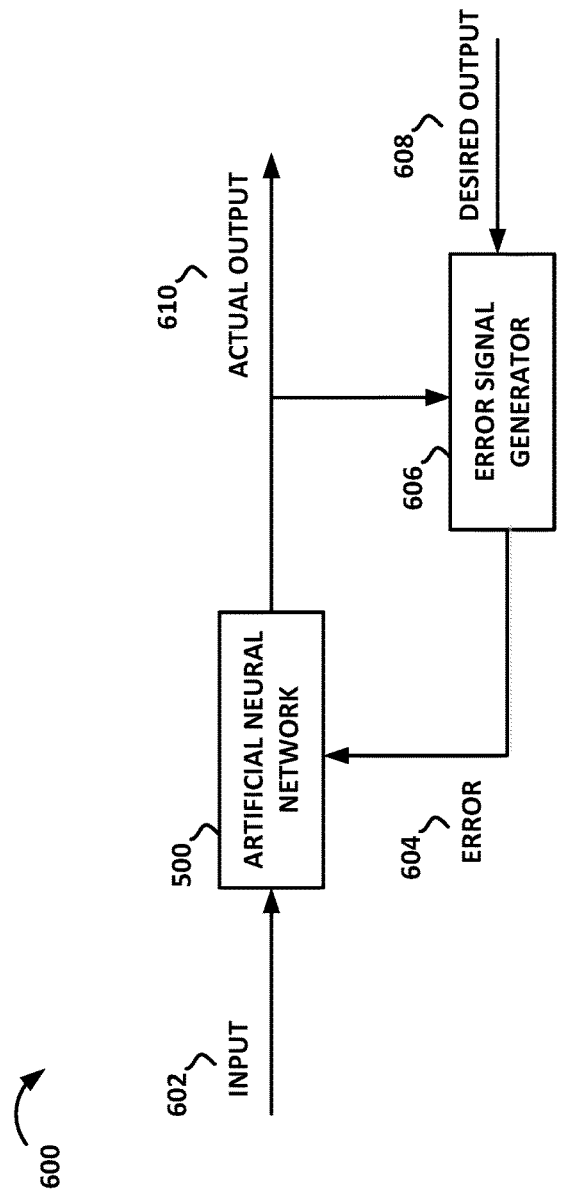
FIG. 6 shows a diagram of features of a neural network, in accordance with certain embodiments of the present disclosure.

FIG. 6 shows a diagram 600 of one approach to compute weighting factors associated with each connection 504 of the artificial neural network 500. The weighting factors are initially set to random values. Input nodes 502A, 502B, etc.—which represent types or classes of input data as discussed above—and a target node 506 are chosen to create node pairs. Next, activations (e.g., input 602) are propagated from the input nodes 502A, 502B to hidden nodes 508 for each input node 502, and then activations are propagated from the hidden nodes 508 to target nodes 506 for each hidden node 508. An error value 604 is then computed for target nodes 506 by an error signal generator 606 by comparing the desired output 608 to the actual output 610.

Next, error 604 is computed for hidden nodes 508. Based on the computed errors, weighting factors from the connections 504 are adjusted between the hidden nodes 508 and target nodes 506. Weighting factors are then adjusted between the input nodes 502 and the hidden nodes 508. To continue to update the weighting factors (and therefore train the artificial neural network 500), the process restarts where activations are propagated from the input nodes 502 to hidden layer nodes 506 for each input node 502. The artificial neural network 500 is "trained" once little to no error is computed, with weighting factors relatively settled. Essentially, the trained artificial neural network 500 learns what nodes (and therefore, inputs) should be given more weight when computing the target output.

In certain embodiments, the target output is a determination of one or more fly-height parameters or inputs used to calculate fly-height parameters. For example, the target output could be data predictive of head-to-media spacing during read operations at a second temperature, data predictive of head-to-media spacing during write operations at the second temperature, and/or associated information about the tracks (e.g., track radius) and the read and write head-to-media spacing.

As referred to above, FIG. 4 shows the computing device 410 that features the artificial neural network 412. The artificial neural network 412 can include similar features to the artificial neural network 500 described above and can be trained as described generally above and more specifically below. The artificial neural network 410 and its various features and components can be implemented in one or more computing devices (e.g., personal computer, laptop, server) that contain one or more processors 416 and memory 414. For example, the artificial neural network 412 may be implemented using firmware, integrated circuits, and/or software modules within the one or more computing devices that interact with each other or are combined together. In certain embodiments, the methods disclosed herein and outlined in the figures can be implemented using computer-readable instructions/code that are stored in the memory 414 (or other forms of storage) for execution by the one or more processors 416.

Figure 7:
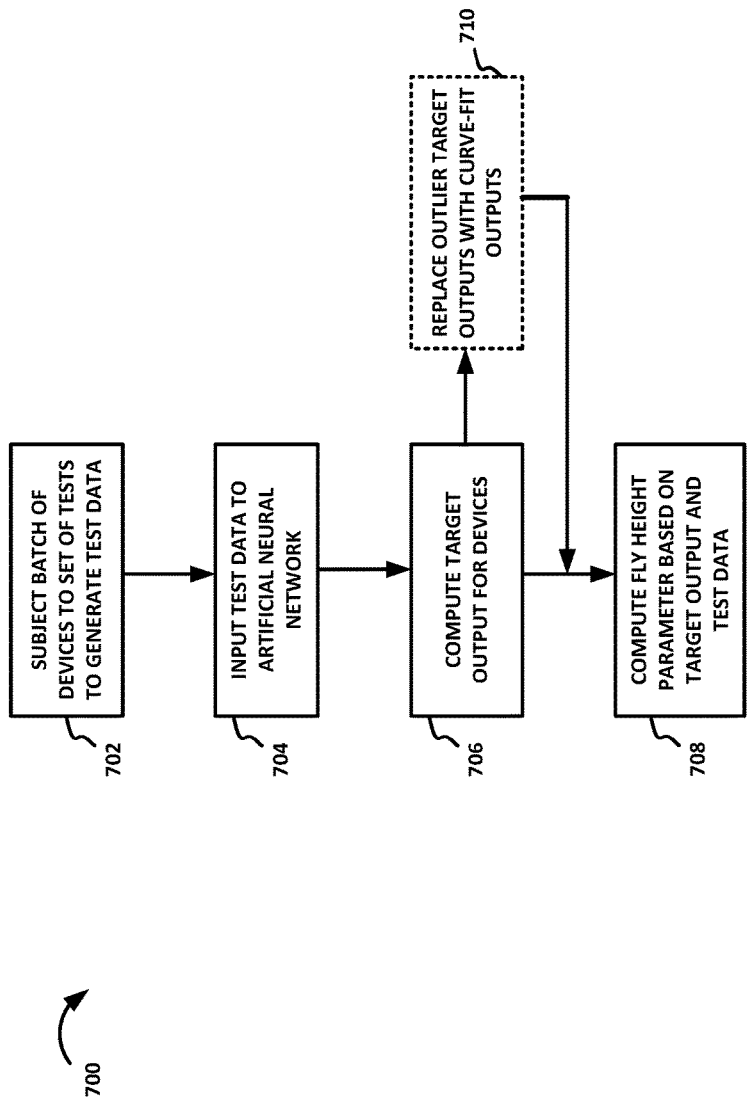
FIG. 7 shows a block representation of steps in a method for establishing a fly height parameter of a hard disc drive, in accordance with certain embodiments of the present disclosure.

FIG. 4 shows a batch of hard disc drives 418 that are subjected to a series of tests (step 702 in FIG. 7), and FIG. 7 outlines a set of steps of a method 700 that can be carried out with the computing device 410. As mentioned above, the series of tests generate data about a hard disc drive's performance and features, including servo parameter values (e.g., eccentricity of tracks with respect to the magnetic recording disc 106 and PES), magnetic recording medium flaw parameter values (e.g., number of flaws and/or the location of particular areas of the magnetic recording disc 106), and/or fly height parameter values at a first temperature (e.g., head-to-media spacing taken during read operations, measurements regarding head-to-media spacing taken during write operations, and information about the tracks at which the measurements were taken). In certain embodiments, the series of tests are all performed at a first, nominal temperature. The computing device 410 receives the generated data and inputs the data to the artificial neural network 412 (step 704).

As mentioned above and described below, in certain embodiments, the artificial neural network 412 is trained to compute a target output based on the inputted datasets (step 706). For example, the predicted target output may include data predictive of head-to-media spacing during read operations at a second temperature, data predictive of head-to-media spacing during write operations at the second temperature, and associated information about the tracks (e.g., track radius) and/or the read and write head-to-media spacing at the second temperature. Although only one artificial neural network is described above, the computing device 410 can include multiple artificial neural networks and compute multiple predicted performance metrics.

Once the target output is computed, the computing device 410 can compute a fly-height parameter (step 708). For example, the computing device 410 may use the target output as input to calculating a TCS on a head-by-head and zone-by-zone basis. In addition to the target output, the computing device 410 may use fly-height data (e.g., head-to-media spacing) generated from fly-height tests performed at the first temperature as input to calculating a TCS on a head-by-head and zone-by-zone basis. In certain embodiments, the computing device 410 calculates a separate TCS to be used during read operations versus write operations. In such embodiments, the artificial neural network 412 may use different inputs to compute the "read" target output compared to the "write" target output. For example, the "write" target output may be based on certain writer-specific test data (e.g., write errors detected during tests and associated information) compared to data for the "read" target output. As described above, the target output essentially replaces the fly-height tests typically performed at a second temperature—thus reducing overall manufacturing time and increasing reliability of the manufactured hard disc drives. The calculated TCS values can be stored in a hard disc drive's memory for use during operation such that the hard disc drive stays within a preferred range of head-to-media spacings at different operating temperatures.

Figure 8:
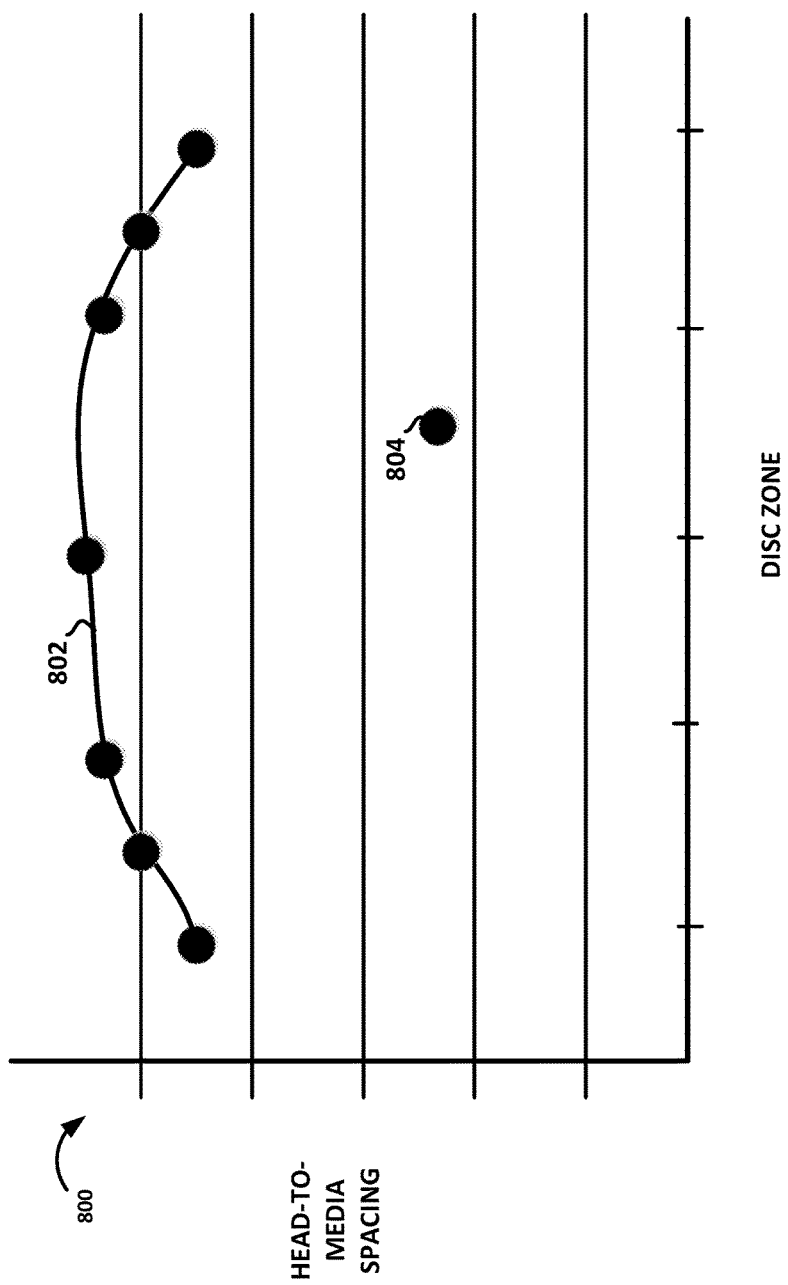
FIG. 8 shows a graph of head-to-media spacings along zones of a magnetic recording disc, in accordance with certain embodiments of the present disclosure.

In certain embodiments, the method 700 also includes one or more steps involving rejecting and/or replacing outlier target outputs (step 710). FIG. 8 shows a simplified graphical representation 800 of target outputs (e.g., predicted head-to-media spacings of a read/write head at a second temperature) at different zones along a disc. A curve 802 is fitted to the target outputs. As can be seen in FIG. 8, one of the target outputs 804 does not fit along the curve 802. This identified target output 804 can be rejected and/or replaced with a curve-fitting head-to-media spacing before the target outputs are used to compute a TCS. This step of rejecting and/or replacing outlier target outputs can be performed on a head-by-head basis and can be done separately for the "read" target outputs and the "write" target outputs.

Figure 9:
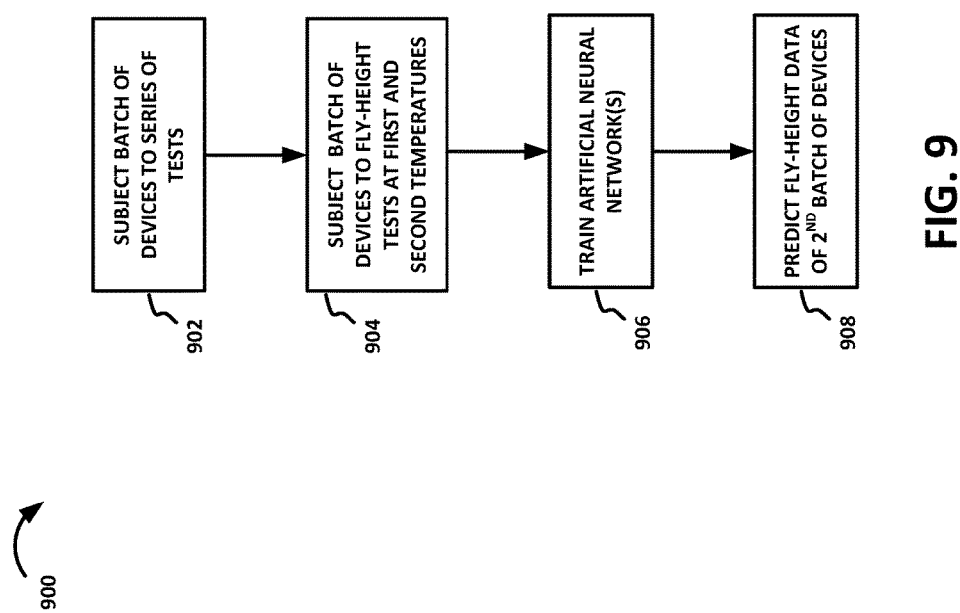
FIG. 9 shows a block representation of steps in a method for training an artificial neural network, in accordance with certain embodiments of the present disclosure.

As described above, the artificial neural network 412 is trained before being used to compute the target output. The process 900 of training the artificial neural networks is outlined in FIG. 9. The artificial neural network(s) 412 can be trained based on samples of the above-described data associated with known results. For example, a batch of hard disc drives can be subjected to the above-described non-fly-height tests (e.g., writing servo, calibrating servo parameters, scanning for flaws of the magnetic recording discs) to generate testing data (step 902). The batch of hard disc drives can also be subjected to fly-height tests performed at the first temperature and fly-height tests performed at the second temperature (step 904). The artificial neural network can use previous test data (e.g., data generated and collected from the series of non-fly-height tests, including data not typically used to compute fly-height data) as known inputs and each hard disc drive's fly-height data as a known output (e.g., target) to train the artificial neural network(s) (step 906). The trained artificial neural network can develop a computational model capable of predicting, based on the type of information described above, a hard disc drive's fly-height data for a second temperature (step 908). For example, the trained artificial neural network can use test data from the series of tests associated with a second batch of hard disc drives to predict performance (e.g., head-to-media spacing on a head-by-head and zone-by-zone basis) of the hard disc drives in the second batch. In certain embodiments, the trained artificial neural network makes such predictions without actually subjecting the second batch of hard disc drives to the fly-height tests at the second temperature—thus reducing the time to manufacture the hard disc drives. As such, the process of determining a fly-height parameter can utilize a multi-variant (e.g., testing data from a variety of tests), non-linear (e.g., artificial neural networks with different weighted nodes/inputs) approach to save testing time.

In certain embodiments, the training batch of hard disc drives is a small percentage of the overall number of hard disc drives manufactured, such that only a small percentage of hard disc drives are used to train the artificial neural networks. The first batch of hard disc drives subjected to the fly-height tests at the second temperature should be representative of the second batch hard disc drives that will not be subjected to such tests. In certain embodiments, data from the training batch of hard disc drives are used to fly-height data at a second temperature of an entire hard disc drive product line. In certain embodiments, the artificial neural networks are retrained when certain manufacturing processes are changed, as those changes may affect how representative the original training data is for hard disc drives manufactured under a different process.

The number of "training" hard disc drives used can vary. In certain embodiments, ten percent or less of a model or batch of hard disc drives are subjected to fly-height tests at the second temperature train the artificial neural networks, while the remaining ninety percent or more of the model or batch of hard disc drives are "tested" through the trained artificial neural networks. Of course, other percentages (e.g., 20%, 30%, 40%) of models or batches of hard disc drives can be used to train the artificial neural networks. Using a greater number of hard disc drives to train the artificial neural networks may improve reliability of the trained artificial neural network but decrease the test time savings.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for establishing a fly height parameter for a hard disc drive, the method comprising:
   receiving a set of testing data associated with the hard disc drive;
   subjecting the hard disc drive to a fly-height test while operating the hard disc drive at a first, nominal temperature to generate fly-height data;
   based on the set of testing data and the fly-height data, predicting the hard disc drive's fly-height data for a fly-height test performed while operating the hard disc drive at a second temperature different from the first, nominal temperature; and
   in response to the fly-height data and the predicted fly-height data, establishing the fly-height parameter for the hard disc drive.

2. The method of claim 1, wherein the fly-height parameter is used to control a head-to-media spacing of a read/write head of the hard disc drive.

3. The method of claim 1, wherein the fly-height parameter is used to control a heater current of a read/write head of the hard disc drive.

4. The method of claim 1, wherein the fly-height parameter is a thermal clearance slope.

5. The method of claim 4, wherein the thermal clearance slope is a linear slope of head-to-media spacing as a function of temperature.

6. The method of claim 1, further comprising:
   in response to the fly-height data and the predicted fly-height data, establishing the fly-height parameter for multiple zones of a magnetic recording disc.

7. The method of claim 1, further comprising:
establishing a zone-by-zone curve of the predicted fly-height data; and
rejecting predicted fly-height data that are inconsistent with the established curve.

8. The method of claim 7, wherein the established fly-height parameter is based only on non-rejected predicted fly-height data.

9. The method of claim 1, further comprising:
in response to the fly-height data and the predicted fly-height data, establishing a plurality of fly-height parameters for the hard disc drive.

10. The method of claim 9, further comprising:
in response to the fly-height data and the predicted fly-height data, establishing a fly height parameter for each read/write head of the hard disc drive.

11. The method of claim 1, further comprising:
subjecting the hard disc drive to the plurality of tests to generate the set of testing data associated with the hard disc drive.

12. The method of claim 1, wherein the step of establishing the fly-height parameter for the hard disc drive is performed using a trained artificial neural network to predict the hard disc drive's fly-height data.

13. The method of claim 12, further comprising:
training an artificial neural network to predict the fly-height data for a fly-height test at the second temperature based on testing data including fly-height data from the fly-height test at the first, nominal temperature and fly-height data from a fly-height test at the second temperature.

14. The method of claim 1, wherein the fly-height test involves causing head-to-disc contract, and wherein predicting the hard disc drive's fly-height data for the fly-height test at the second temperature does not involve causing head-to-disc contract.

15. The method of claim 1, further comprising:
storing the established fly-height parameter to memory of the hard disc drive.

16. A method for establishing a fly height parameter for a hard disc drive, the method comprising:
receiving a set of testing data associated with the hard disc drive;
receiving fly-height data associated with the hard disc drive and generated from a fly-height test performed at a first, nominal temperature;
based on the set of testing data and the fly-height data, predicting the hard disc drive's fly-height data for a fly-height test at a second temperature different from the first, nominal temperature;
establishing a curve of the predicted fly-height data;
generating modified predicted fly-height data by deleting predicted fly-height data that are outliers with the established curve; and
in response to the fly-height data and the modified predicted fly-height data, establishing the fly-height parameter for the hard disc drive.

17. The method of claim 16, further comprising:
establishing a curve of the predicted fly-height data on a head-by-head basis;
generating modified predicted fly-height data, on a head-by-head basis, by deleting predicted fly-height data that are outliers with the established curves; and
in response to the fly-height data and the modified predicted fly-height data, establishing the fly-height parameter for the hard disc drive.

18. A system for establishing a fly height parameter for a hard disc drive, the system comprising:
a computing device comprising a trained artificial neural network, a processor, and a memory, wherein
the computing device is configured to:
receive a set of testing data associated with the hard disc drive,
receive fly-height data associated with the hard disc drive and generated from a fly-height test performed at a first, nominal temperature,
compute fly-height data for a fly-height test at a second temperature using the trained artificial neural network, the received set of testing data, and the received fly-height data, and
compute a plurality of fly-height parameters for the hard disc drive based on at least the received fly-height data and the computed fly-height data.

19. The system of claim 18, wherein the computing device is further configured to:
establish a trend of the computed fly-height data, and
generate modified predicted fly-height data by deleting predicted fly-height data that are outliers with the established curve.

20. The system of claim 19, wherein the computing device is further configured to:
establish the fly-height parameter for the hard disc drive based on at least the modified predicted fly-height data.

* * * * *